United States Patent Office 3,562,199
Patented Feb. 9, 1971

3,562,199
ANNEALING OF ARYLENE SULFIDE POLYMERS
Harold Wayne Hill, Jr., and James T. Edmonds, Jr., Bartlesville, Okla., assignors to Phillips Petroleum Company, a corporation of Delaware
No Drawing. Continuation-in-part of application Ser. No. 492,333, Oct. 1, 1965, which is a continuation-in-part of application Ser. No. 327,143, Nov. 27, 1963. This application Feb. 6, 1969, Ser. No. 797,267
Int. Cl. C08g 23/00, 51/04
U.S. Cl. 260—37
23 Claims

ABSTRACT OF THE DISCLOSURE

The physical properties of shaped bodies of arylene sulfide polymers are improved by annealing at a temperature below the melting point of the polymer.

BACKGROUND OF THE INVENTION

This application is a continuation-in-part application of our copending application having Ser. No. 492,333, filed Oct. 1, 1965, now abandoned, which is a continuation-in-part application of Ser. No. 327,143, filed Nov. 27, 1963, now patent, U.S. 3,354,129.

This invention relates to annealing of polymers to improve properties of same.

In one of its aspects, this invention relates to a method of annealing shaped, solid polymers of aromatic compounds to improve the physical properties thereof. In another aspect, this invention relates to annealing polymers of aromatic compounds at a temperature where the physical properties can be improved without changing the basic form of the polymer. In still another aspect, this invention relates to a process for improving physical properties of a molded polymer by an annealing process. In yet another aspect, this invention relates to improving the strength properties of polymers of aromatic compounds at elevated temperatures. In a further aspect, this invention relates to annealing at elevated temperatures cured and uncured polymers of aromatic compounds.

Certain crystallizable polymers, such as, for example, polypropylene, are affected by increased temperatures. It is known that polypropylene can be heated to effect changes in the properties of the polymer. Poly(phenylene sulfide) polymers have been heated to extremely high temperatures in the past to effect changes therein. For example, it is known that poly(phenylene sulfide) polymer can be altered by heating at a temperature in the range of 400 to 500° C. However, at these high temperatures chemical changes such as cross-linking become quite pronounced, thus leading to a different polymer rather than an annealed form of the original polymer. Since it is sometimes desirable to attempt to improve the physical properties of a polymer, the changes resulting from such high temperatures are undesirable, in that the entire polymer is changed.

We have now discovered a method of obtaining improved physical properties of polymers of aromatic compounds by annealing.

By various aspects of this invention, one or more of the following or other objects can be obtained.

It is an object of this invention to provide a shaped, solid polymer of an aromatic compound having improved physical properties.

It is another object of this invention to provide a method of annealing shaped, solid polymers without causing extreme chemical changes leading to the change to a much different polymer.

Still another object of this invention is to provide a shaped, solid polymer having improved structural characteristics in a simple, economic, and expedient way.

Another object of this invention is to produce a molded polymer having desirable physical characteristics.

Other aspects, objects, and the several advantages of this invention are apparent from a study of this disclosure and the appended claims.

SUMMARY OF THE INVENTION

According to said patent, arylene sulfide polymers can be prepared in high yield by reacting at least one polyhalo-substituted cyclic compound containing unsaturation between adjacent ring atoms and wherein the halogen atoms are attached to ring carbon atoms with an alkali metal sulfide in a polar organic compound at an elevated temperature. Generally, the polar organic compound will substantially dissolve both the alkali metal sulfide and the polyhalo-substituted aromatic compound, or other compound which may be present, as will appear hereinafter.

The polymers produced by the process of said patent will vary considerably, depending upon the chosen reactants. Some are high melting thermoplastic materials having excellent high temperature stability, while others can be much lower in molecular weight, including liquids and grease-like materials. The melting point or softening point of these polymers can range all the way from liquids at 25° C. to polymers melting above 400° C. These polymers can be cured, i.e., heat treated in the absence of oxygen or with an oxidizing agent, either under vacuum or at atmospheric or superatmospheric pressures, to increase the molecular weight by either a lengthening of a molecular chain or by crosslinking or by a combination of both to improve such properties as tensile strength. Such treatment can be effected, for example, by heating the polymer preferably to a temperature above its melting point, in some cases as high as 250 to 500° C. Such heat treatment can be carried out while contacting the polymer with air or under vacuum or under an inert gas such as nitrogen.

The polymers produced by the process of said patent can be molded into a variety of useful articles by molding techniques which are well known in the art. Molding should be carried out above the melting point or softening point but below the decomposition point of the particular polymer being molded. Suitable molding techniques include injection molding, compression molding, vacuum forming, extrusion and the like. The polymers can be molded directly after recovery from the reaction zone in which they are prepared, or such polymers can be subjected to a heat treatment as described above prior to molding. In a further aspect, according to said patent, heat treatment below the softening point can be utilized for molded items.

According to the present invention, there is provided a process of improving the physical properties of shaped, solid arylene sulfide polymers such as defined in said copending application comprising annealing said polymers within a specified temperature range. There is further provided according to this invention molded polymers of aromatic compounds having improved physical properties resulting from annealing.

The preferred arylene sulfide polymers for use in the annealing process of this invention are those that are at least partially crystallizable.

The annealing process of this invention can be accomplished at temperatures between the second order transition temperature of the polymer as a lower limit and the crystalline melting point of the polymer as an upper limit. In general, the annealing can be accomplished at temperatures between about 175° F. to about 650° F., which satisfy the above-mentioned relationship between the second order transition temperature and the crystalline melting point. A more preferred temperature range is from about 230° F. to about 525° F. It has also been found that, in general, polymers which can be utilized in this invention as described below must have a crystalline melting point in excess of about 375° F. Although it is impossible to formulate an exact theoretical explanation for this behavior, it is postulated that several possible explanations exist. The first is that this low melting temperature, i.e., below 375° F., is generally indicative of an extremely low molecular weight polymer. Secondly, this low melting temperature of polymers of the instant invention is also generally indicative of chemical impurities within the structure from side reactions, poor purification techniques, etc. These impurities hinder the relief of internal stresses and also hinder the polymer chain mobility which is necessary to promote some chain rearrangement into crystalline lattice structures which result in the improvement in physical properties in the instant invention.

These chemical impurities are to be distinguished from the fillers which can be added to the polymers of the instant invention before annealing and which do not, upon annealing, substantially lessen the improvement in physical properties of the polymers in which they are incorporated. These polymers can be blended with fillers, pigments, stabilizers, softeners, and extenders. Such fillers as graphite, carbon black, carbon cloth, carbon fibers, titania, glass fibers, glass cloth, glass particles, metal powders, magnesia, alumina, ferric oxide, asbestos, clays, wood flour, cotton floc, alpha cellulose, mica and the like, and combinations thereof, e.g., asbestos-alumina and glass fibers-alumina, can be employed. A more complete list of fillers is disclosed in Modern Plastics Encyclopedia, 41, No. 1a, September 1963, pages 529–536. For example, glass, asbestos, titania, clay, ferric oxide, alumina, asbestos-alumina, or glass fibers-alumina can be added in an amount from about 2 to about 75 weight percent based on total weight of filled polymer. If desired, such fillers can be added to the polymerization reactor. These filled polymers are particularly useful in ultra-high temperature applications such as ablative nose cones.

The time for which the polymer is annealed at the foregoing temperatures varies within the range of from about 15 minutes to about 50 hours, preferably within the range of about 30 minutes to about 25 hours. The temperature and time are interdependent, and also depend upon such factors as the nature of the polymer and the properties desired. In determining the optimum time-temperature relationship, it is important to know the melting point of the polymer to be treated as indicated above, in order that the polymer can be treated at a temperature below that at which it will melt in order for at least some crystallization to occur. Higher annealing temperatures can be used for the higher melting polymers than can be used for the lower melting polymers. Also, in determining the optimum time-temperature relationship, the wall thickness of the shaped article is important. Higher temperatures and/or longer times at a given temperature are required as the wall thickness of the article increases. In general, higher temperatures and/or longer times at a given temperature are required for annealing if the polymer is first cooled to room temperature after molding than if the polymer is cooled only to the annealing temperature after molding and held at that temperature for a sufficient period of time to effect the desired improvement in physical properties. For the latter operation times in the lower end of the above-mentioned ranges can be employed. However, it has been found that the normal cool-down time after molding that is employed in present commercial operations is generally insufficient to achieve the benefits of the instant invention.

The annealing process of this invention imparts to the polymers improved strength properties at elevated temperatures. These properties include improved tensile strength, flexural strength, compressive strength, and impact strength; and a lower percent of elongation and higher flexural modulus, density, crystallinity and hardness. Although the improvements in strength properties are outstanding at elevated temperatures, the improvements are also existent at lower temperatures.

Particularly indicative of the time and temperature necessary to achieve an improvement in the above-mentioned physical properties is the percentage increase in density of the annealed polymer over the unannealed polymer. It has been found that for unannealed polymers having a density of from about 1.315 gms./cc. to about 1.325 gms./cc. an increase in density of from about 1.4 to about 1.6 percent indicates that a proper temperature and time have been employed to effect an excellent improvement in the other above-mentioned physical properties; and hence, can be used as a control property in determining time-temperature relationships. For unannealed polymers of from about 1.340 to about 1.345 gms./cc. density, an increase of from about 0.4 to about 0.6 percent is desirable. From these two relationships, one skilled in the art can easily predict the necessary increase in density in order to select a proper time and temperature for a polymer of a particular density. In general, the time and temperature should be selected to achieve an increase in density of at least about 0.1 percent above the density of the unannealed polymer to obtain some benefit from the instant invention.

The process of this invention is applicable for use with molded polymers of aromatic compounds as described in said copending application which are partially crystallizable. It has particular utility when applied with a partially crystallizable polymer prepared by the reaction of polyhalo-substituted aromatic compounds with alkali metal sulfides, such as those described in said copending application. Among the polymers which are suitable for use according to this invention are homopolymers, copolymers, block polymers and the like. The process can also be applied to polymers which are either cured or uncured, i.e., to polymers which either have or have not received prior heat treatment designed to alter the nature of the polymers.

The polyhalo-substituted compounds which can be employed as primary reactants according to said copending application are represented by the formulas:

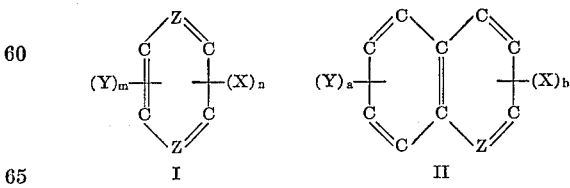

I  II

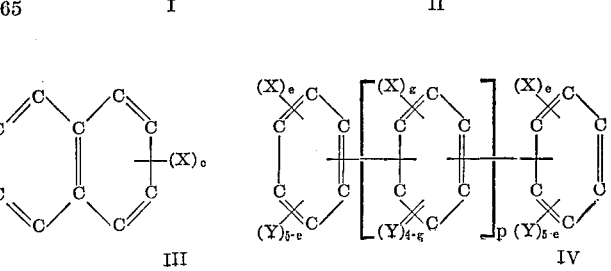

III  IV

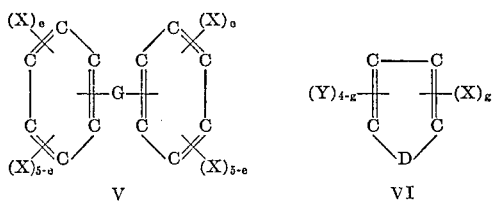

V  VI wherein each X is a halogen selected from the group consisting of chlorine, bromine, iodine, and fluorine, preferably chlorine and bromine, each Y is selected from the group consisting of hydrogen,

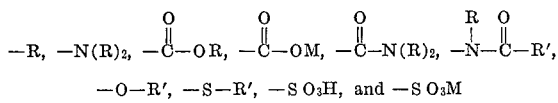

$-O-R'$, $-S-R'$, $-SO_3H$, and $-SO_3M$ wherein each —R is selected from the group consisting of hydrogen and alkyl, cycloalkyl, aryl, aralkyl, and alkaryl radicals containing from 1 to 12 carbon atoms, inclusive; each R' is selected from the group consisting of alkyl, cycloalkyl, aryl, aralkyl and alkaryl radicals containing from 1 to 12 carbon atoms, inclusive; each Z is selected from the group consisting of —N= and —C=; D is selected from the group consisting of —O—, —S—, and

G is selected from the group consisting of

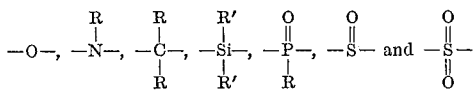

M is an alkali metal selected from the group consisting of sodium, potassium, lithium, rubidium, and cesium; $n$ is a whole integer of from 2 to 6, inclusive; when both Z's in Formula I are —C=, $m=6-n$, when one Z in Formula I is —C=, $m=5-n$, when both Z's in Formula I are —N=, $m=4-n$; $b$ is a whole integer of from 2 to 8, inclusive, when Z in Formula II is —C=, $a=8-b$, when Z in Formula II is —N=, $a=7-b$; $c$ is a whole integer of from 2 to 10, inclusive, $e$ is a whole integer of from 1 to 5, inclusive, $g$ is a whole integer of from 2 to 4, inclusive, and $p$ is a whole integer selected from the group consisting of 0 and 1.

The compounds of the above general formulas which are preferred are those which contain not more than three halogen atoms, and more preferably are dihalo-substituted compounds.

The alkali metal sulfides which can be employed in the process of said copending application are represented by the formula $M_2S$ wherein M is as defined above, and includes the monosulfides of sodium, potassium, lithium, rubidium and cesium, including the anhydrous and hydrated forms of these sulfides. The preferred sulfide reactant is $Na_2S$ and its hydrates. This sulfide can be purchased having 9 mols of water of hydration per mol of $Na_2S$, or it can be obtained containing about 60–62 weight percent $Na_2S$ and about 38–40 weight percent water of hydration.

The polar organic compounds which are employed as reaction media in the process of said copending application should be solvents for the polyhalo-aromatic compounds and the alkali metal sulfides. Representative examples of suitable classes of compounds include amides, lactams, sulfones, and the like. Specific examples of such compounds are hexamethylphosphoramide, tetramethylurea, N,N' - ethylene dipyrrolidone, N-methyl-2-pyrrolidone (NMP), pyrrolidone, caprolactam, N-ethylcaprolactam, sulfolane, dimethylacetamide, low molecular weight polyamides and the like.

Some specific examples of polyhalo-substituted compounds of the above general formulas which can be employed in the process of said copending application are:

1,2-dichlorobenzene
1,3-dichlorobenzene
1,4-dichlorobenzene
2,5-dichlorotoluene
1,4-dibromobenzene
1,4-diiodobenzene
1,4-difluorobenzene
2,5-dibromoaniline
N,N-dimethyl-2,5-dibromoaniline
1,3,5-trichlorobenzene
1,2,4,5-tetrabromobenzene
1,2,4-trichlorobenzene
hexachlorobenzene
1-n-butyl-2,5-dichlorobenzene
and the like.

The following specific examples illustrate the improved method of treating polymers and the improved products resulting therefrom of this invention.

EXAMPLE I

A mixture of 1382 grams of sodium sulfide nonahydrate and 2900 ml. of N-methyl-2-pyrrolidone was heated in a stirred reactor equipped with a condenser until 1350 ml. of distillate was collected. This preliminary heating was for the purpose of removing water of hydration from the sodium sulfide nonahydrate. Then 854 grams of p-dichlorobenzene and 550 ml. of N-methyl-2-pyrrolidone were added to the residue, the latter being added to compensate for the loss of this solvent in the distillate. The reactor was then sealed, and the contents of the reactor were heated at 500° F. for two hours. The reaction mixture was then cooled and filtered, and the solid polymer was washed with acetone, then with water. The washed polymer was next heated with water at 320° F. for 80 minutes, after which the polymer was separated by filtration and again heated with water at 320° F. for 80 minutes. The mixture was then filtered, and the solid polymer was washed with acetone and vacuum-dried at 180° F. The resulting purified poly(p-phenylene sulfide) was combined with poly(p-phenylene sulfide) prepared similarly in five other experiments, and the mixture (approximately 7 lb.) was blended by stirring a slurry of the polymer in acetone. The polymer was then filtered from the acetone and dried. The dried polymer was cured in portions of approximately 300 grams each by heating for 3½ hours at about 689° F. under a pressure of 0.5 mm. Hg or less. Each of the cured portions was ground in a mill, and all of the ground portions was combined and mixed thoroughly. The ground polymer was then molded at approximately 640° F. into slabs 6" x 6" x ⅛". The slabs were annealed in an air oven for periods of time ranging from 3 to 12 hours and at temperatures ranging from 230 to 536° F., after which the slabs were allowed to cool to room temperature. The polymer was not molten at these annealing temperatures. Properties of the annealed polymer were determined through use of test bars cut from the above slabs. Density and relative crystallinity were determined at room temperature; tensile strength, elongation, and flexural modulus were determined at 250° F. These properties are shown in Table I, together with properties of the same polymer without the annlealing treatment.

TABLE I

| Sample | Annealing conditions | | Tensile strength,[1] lb./sq. in. | Elongation,[1] percent | Flexural modulus[2] lb./sq. in. ×10⁻³ | Density, g./ml. |
|---|---|---|---|---|---|---|
| | Temperature, °F. | Time, hr. | | | | |
| 1 | [3] | | 1,060 | 118 | 8 | 1.320 |
| 2 | 230 | 3 | 1,602 | >141 | 14 | 1.328 |
| 3 | 230 | 8 | 2,027 | 56 | 20 | 1.335 |
| 4 | 230 | 12 | 2,107 | 64 | 21 | 1.332 |
| 5 | 300 | 3 | 2,867 | 33 | 37 | 1.340 |
| 6 | 300 | 8 | 2,947 | 32 | 37 | 1.340 |
| 7 | 300 | 12 | 3,053 | 32 | 37 | 1.342 |
| 8 | 400 | 3 | 3,460 | 20 | 42 | 1.341 |
| 9 | 400 | 8 | 3,757 | 19 | 49 | 1.344 |
| 10 | 400 | 12 | 3,747 | 17 | 54 | 1.343 |
| 11 | 482 | 3 | 3,940 | 23 | 48 | 1.348 |
| 12 | 482 | 8 | 4,117 | 21 | 60 | 1.348 |
| 13 | 482 | 12 | 4,443 | 18 | 70 | 1.350 |
| 14 | 536 | 3 | 3,543 | 32 | 44 | |
| 15 | 536 | 8 | 3,493 | 25 | 41 | |

[1] ASTM D 638-60T.
[2] ASTM D 747-58T.
[3] Not annealed.

NOTE: Sample 13, which was annealed at 482° F. for 12 hours, had a crystallinity 5.1 times as great as that of Sample 1, which was not annealed, as based on measurement of the net peak height of the 4.32 angstrom line of the X-ray diffraction pattern of the polymer samples.

Another sample of cured molded poly(p-phenylene sulfide), prepared in a manner similar to that described above, was annealed at 383° F. for 5 hours. The properties, at room temperature, before and after annealing are shown in Table II.

TABLE II

| Property | Unannealed | Annealed |
|---|---|---|
| Tensile strength,[1] lb./sq. in. | [2] 10,400 | [3] 13,300 |
| Elongation,[1] percent | 8 | 4 |
| Flexural modulus,[4] lb./sq. in. | 400,000 | 496,000 |
| Flexural streangth,[5] lb./sq. in. | 16,900 | 22,350 |
| Impact strength (Izod),[6] ft. lb. | 0.66 | 0.69 |
| Shore "D" hardness [7] | 84 | 86 |

[1] ASTM D 638-60T.
[2] Yield.
[3] Break.
[4] ASTM D 747-58T.
[5] ASTM D 790-59T.
[6] ASTM D 256-56.
[7] ASTM D 1706-61 Shore durometer, type D.

A sample of cured molded poly(p-phenylene sulfide), similarly perpared, was annealed at 383° F. for 48 hours. The compressive strength, at room temperature, before and after annealing is shown in Table III.

TABLE III

| Compressive strength [1] | Unannealed | Annealed |
|---|---|---|
| Stress at 1% deformation, lb./sq. in. | 2,570 | 1,900 |
| Yield, lb./sq. in. | 12,000 | 30,000 |

[1] ASTM D 695-54.

The Vicat softening point (ASTM D 1525-58T) of another sample of cured molded poly(p-phenylene sulfide), prepared in a manner similar to that described above, was about 230° F. before annealing and greater than 300° F. after annealing at 383° F. for 8 hours.

Thus, annealing of the cured poly(p-phenylene sulfide) generally imparted to the polymer improved tensile strength, flexural strength, and compressive strength, as well as a lower percent of elongation and higher flexural modulus, density, crystallinity, and hardness and softening point. The improvement in strength properties at elevated temperatures is particularly outstanding.

EXAMPLE II

A mixture of 720 g. of sodium sulfide nonahydrate and 1000 ml. of N-methyl-2-pyrrolidone was heated until 537 grams of distillate was collected, this treatment being for the purpose of removing water of hydration from the sodium sulfide nonahydrate. The residual solution was then transferred to a rocking autoclave and heated to 400° F., after which a solution of 407 grams of p-dichlorobenzene and 36 grams of 1,2,4-trichlorobenzene in 400 ml. of N-methyl-2-pyrrolidone was added. The contents of the autoclave were then heated at 485 to 520° F. for three hours. The reaction mixture was filtered, and the solid polymer was washed with water and with acetone. The washed polymer, after drying in a vacuum oven, weighed 284 grams. The dried polymer was combined with additional dried polymer prepared similarly in eleven other experiments, and the mixture was blended by stirring a slurry of the polymer in acetone. The polymer was then filtered from the acetone and dried, after which a portion of it was molded at approximately 600° F. into slabs 6" x 6" x ⅛". The slabs were annealed in an air oven for periods of time ranging from 3 to 12 hours and at temperatures ranging from 230° F. to 482° F., after which the slabs were allowed to cool to room temperature. The polymer was not molten at these annealing temperatures. Properties of the annealed polymer were determined through the use of test bars cut from the above slabs. Density, relative crystallinity, and hardness were determined at room temperature; tensile strength, elongation, and fluxural modulus were determined at 250° F. These properties are shown in Table IV, together with properties of the same polymer without the annealing treatment.

TABLE IV

| Sample | Annealing conditions | | Tensile strength[1], lb./sq. in. | Elongation,[1] percent | Flexural Modulus[2], lb./sq. in. × 10⁻³ | Density, g./ml. | Shore "D" hardness [3] |
|---|---|---|---|---|---|---|---|
| | Temperature, °F. | Time, hr. | | | | | |
| 1 | [4] | | 118 | 69 | [5] | 1.321 | 80 |
| 2 | 230 | 3 | 419 | 77 | [5] | 1.321 | 82 |
| 3 | 230 | 8 | 913 | 84 | [5] | 1.320 | |
| 4 | 230 | 12 | 1,323 | 60 | [5] | 1.321 | 84 |
| 5 | 300 | 3 | 2,580 | 24 | 37 | 1.342 | 86 |
| 6 | 300 | 8 | 2,807 | 53 | 41 | 1.342 | |
| 7 | 300 | 12 | 2,872 | 50 | 46 | 1.344 | |
| 8 | 400 | 3 | 2,830 | 33 | 41 | 1.344 | 86 |
| 9 | 400 | 8 | 2,920 | 39 | 50 | 1.345 | 86 |
| 10 | 400 | 12 | 2,563 | 39 | 34 | 1.342 | |
| 11 | 482 | 3 | 1,273 | 41 | 11 | 1.332 | |
| 12 | 482 | 8 | 1,247 | 61 | 5 | 1.332 | 86 |
| 13 | 482 | 12 | 1,733 | 27 | 16 | 1.338 | 87 |

[1] ASTM D 638-60T.
[2] ASTM D 747-58T.
[3] ASTM D 1706-61 Shore durometer, type D.
[4] Not annealed.
[5] Too Limber.

NOTE: Sample 8, which was annealed at 400° F. for 3 hours, possessed a substantial degree of crystallinity, whereas Sample 1, which was not annealed, possessed no crystallinity, as based on measurement of the net peak height of the 4.32 angstrom line of the X-ray diffraction pattern of the polymer samples.

The Vicat softening point (ASTM D 1525–58T) of another sample of the molded polymer prepared in a similar manner was 208° F. before annealing and greater than 300° F. after annealing at 338° F. for three hours.

Thus, annealing of the uncured polymer generally imparted to the polymer improved tensile strength as well as a lower percent of elongation and higher flexural modulus, density, crystallinity, and hardness. The improvement in strength properties at elevated temperatures is particularly outstanding.

EXAMPLE III

A mixture of 1342 grams of sodium sulfide nonahydrate and 2500 ml. of N-methyl-2-pyrrolidone was heated in a stirred reactor equipped with a condenser until 1270 ml. of distillate was collected, thereby removing water of hydration from the sodium sulfide nonahydrate. The residue was then cooled, and 790 grams of p-dichlorobenzene in 920 ml. of N-methyl-2-pyrrolidone was added. The reactor was sealed, and the contents of the reactor was heated at 449–470° F. for 1.5 hours, after which time 24 grams of 1,2,4-trichlorobenzene in 200 ml. of N-methyl-2-pyrrolidone was added. The resulting mixture was heated at 490–504° F. for three hours. The poly(phenylene sulfide) polymer was recovered by filtration and washed twice with acetone, once with water at room temperature, and twice with water at 120° F. The polymer was then rinsed with acetone and vacuum-dried at 180° F. The resulting dry polymer, which weighed 526 grams, was combined with 964 grams of polymer prepared similarly in two other experiments, and the mixture was blended by stirring a slurry of the polymer in acetone. The polymer was then filtered from the acetone and dried, after which it was molded, at 600° F. and 10,000 p.s.i.g. pressure for a period of 30 minutes, into slabs 6" x 6" x ⅛". The slabs were annealed in an air oven for periods of time ranging from 3 to 12 hours and at temperatures ranging from 300° F. to 535° F., after which the slabs were allowed to cool to room temperature. The polymer was not molten at these annealing temperatures. Properties of the annealed polymer were determined through use of test bars cut from the above slabs. Density and relative crystallinity were determined at room temperature; tensile strength, elongation, and flexural modulus were determined at 250° F. These properties are shown in Table V, together with properties of polymer similarly prepared and molded, with and without the annealing treatment.

The flexural strength, determined at 250° F. by the method of ASTM D 790–59T, was 3275 lb./sq. in. for Sample 1 (not annealed) and 6899 lb./sq. in. for Sample 3 (annealed at 400° F. for three hours). The values for the Shore "D" hardness (ASTM D 1706–61; Shore durometer, type D) of Samples 1 and 3 were 87 and 86, respectively, at room temperature.

Thus, annealing of the uncured polymer imparted to the polymer improved tensile strength and flexural strength as well as increased flexural modulus, density, and relative crystallinity. Annealing of the polymer usually effected a decrease in percent elongation. The hardness of the polymer was not affected significantly by the annealing process.

It will be apparent from the foregoing tables and the specific examples that the annealed polymers of this invention possess improved tensile, flexural, and compressive strengths, as well as a lower percent of elongation and higher flexural modulus, density, crystallinity and hardness values compared with the same polymers prior to annealing.

TABLE V

| Sample | Annealing conditions | | Tensile strength[1], lb./sq.in. | Elongation[1], percent | Flexural modulus[2], lb./sq.in. ×10⁻³ | Density, g./ml. |
| --- | --- | --- | --- | --- | --- | --- |
| | Temperature °F. | Time, hr. | | | | |
| 1[3] | (⁴) | | 3,373 | 39 | 38 | 1.3442 |
| 2 | 300 | 12 | 4,240 | >50 | 142 | 1.350 |
| 3[3] | 400 | 3 | 3,697 | 6 | 147 | 1.3578 |
| 4 | 400 | 3 | 5,090 | 19 | 138 | 1.351 |
| 5 | 400 | 8 | 5,312 | 23 | 138 | 1.351 |
| 6 | 400 | 12 | 5,422 | 16 | 146 | 1.351 |
| 7 | 482 | 3 | 5,257 | 41 | 114 | 1.351 |
| 8 | 482 | 8 | 4,410 | 23 | 90 | 1.351 |
| 9 | 482 | 12 | 5,243 | 35 | 102 | 1.351 |
| 10 | 535 | 3 | 4,195 | 41 | 71 | 1.351 |

[1] ASTM D 638–60T.
[2] ASTM D 747–58T.
[3] Sample was obtained from two other polymerization experiments carried out in essentially the same manner as the polymerization experiment described above, with subsequent blending and molding essentially as described above.
[4] Not annealed.

NOTE: Sample 5, which was annealed at 400° F. for 8 hours, had a crystallinity 1.4 times as great as that of Sample 1, which was not annealed, as based on measurement of the net peak height of the 4.32 angstrom line of the X-ray diffraction pattern of the polymer samples.

Reasonable variation and modification are possible within the scope of the foregoing disclosure and the appended claims to the invention, the essence of which is that there has been provided a process for obtaining shaped, solid polymers of aromatic compounds having improved properties comprising annealing said polymer, and an improved polymeric product resulting from said annealing process.

We claim:

1. A process for improving the physical properties of a shaped body comprising an arylene sulfide polymer, said process comprising annealing said shaped body at a temperature between the second order transition temperature and the melting point of said polymer ranging from about 175 to about 650° F. for a time sufficient to effect an increase in the density of said polymer of at least about 0.1 percent, whereby an improvement is also effected in at least one of tensile strength, flexural strength, compressive strength, impact strength, elongation, flexural modulus, and hardness.

2. The product produced by the process of claim 1.

3. A process according to claim 1 wherein said temperature is between about 175° F. and about 650° F.

4. A process according to claim 3 wherein said temperature is between about 230° F. and about 525° F.

5. A process according to claim 1 wherein said arylene sulfide polymer has a melting point in excess of about 375° F.

6. The process of claim 1 wherein said annealing is for a period of time from about 15 minutes to about 50 hours.

7. The process of claim 1 wherein said annealing is for a period of time from about 30 minutes to about 25 hours.

8. The process of claim 1 wherein said arylene sulfide polymer is cured at a temperature above its melting point prior to its incorporation into said shaped body.

9. A process according to claim 1 wherein said shaped body prior to annealing has a density of from about 1.315 to about 1.325 grams per cubic centimeter, and wherein said time is sufficient to effect an increase in density of from about 1.4 to about 1.6 percent.

10. A process according to claim 1 wherein said shaped body has a density of from about 1.340 to about 1.345 grams per cubic centimeter and wherein said time is sufficient to effect an increase in density of from about 0.4 to about 0.6 percent.

11. The process of claim 1 wherein said arylene sulfide polymer is produced by reacting at least one compound selected from the group consisting of:

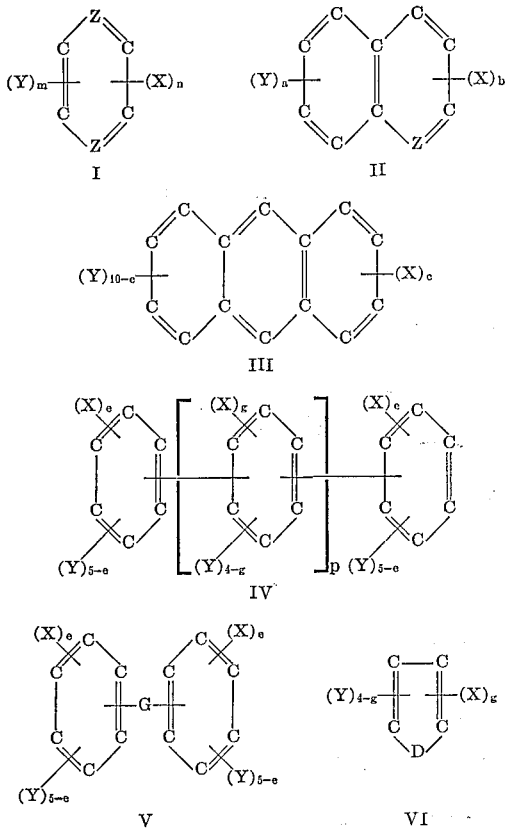

wherein each X is a halogen selected from the group consisting of chlorine, bromine, iodine, and fluorine, preferably chlorine and bromine, each Y is selected from the group consisting of hydrogen,

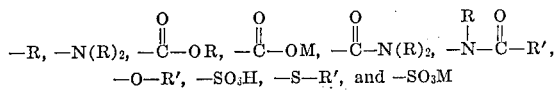

wherein each —R is selected from the group consisting of hydrogen and alkyl, cycloalkyl, aryl, aralkyl, and alkaryl radicals containing from 1 to 12 carbon atoms inclusive; each R' is selected from the group consisting of alkyl, cycloalkyl, aryl, aralkyl and alkaryl radicals containing from 1 to 12 carbon atoms, inclusive; each Z is selected from the group consisting of —N= and —C=; D is selected from the group consisting of

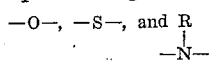

G is selected from the group consisting of

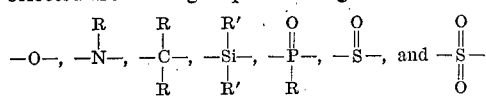

M is an alkali metal selected from the group consisting of sodium, potassium, lithium, rubidium, and cesium; $n$ is a whole integer of from 2 to 6, inclusive; when both Z's in Formula I are —C=, $m=6-n$, when one Z in Formula I is —C=, $m=5-n$, when both Z's in Formula are —N=, $m=4-n$; $b$ is a whole integer of from 2 to 8, inclusive, when Z in Formula II is —C=, $a=8-b$, when Z in Formula II is —N=, $a=7-b$; $c$ is a whole integer of from 2 to 10, inclusive; $e$ is a whole integer of from 1 to 5, inclusive; $g$ is a whole integer of from 2 to 4, inclusive; and $p$ is a whole integer selected from the group consisting of 0 and 1 with an alkali metal sulfide in a polar organic compound at an elevated temperature for a time sufficient to obtain said polymer.

12. The process according to claim 11 wherein said arylene sulfide polymer is produced by reacting a compound of the formula

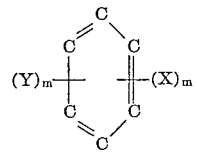

wherein X, Y, and $m$ are as defined in claim 11, with an alkali metal sulfide in a polar organic compound at an elevated temperature for a time sufficient to obtain said polymer 13. The process according to claim 12 wherein said arylene sulfide polymer is a copolymer produced by reacting p-dichlorobenzene and 1,2,4-trichlorobenzene with an alkali metal sulfide in a polar organic compound at an elevated temperature for a time sufficient to obtain said polymer.

14. The process according to claim 13 wherein said shaped body is heated at a temperature from about 230° F. to about 536° F. for from about 30 minutes to about 25 hours.

15. The process according to claim 14 wherein said shaped body is heated for from about 3 hours to about 12 hours.

16. The annealed shaped body produced by the process of claim 15.

17. The process of claim 1 wherein said arylene sulfide polymer further comprises a filler.

18. The process of claim 17 wherein said filler is selected from the group comprising glass, asbestos, titania, clay, alumina, asbestos-alumina, and glass fibers-alumina.

19. The process of claim 18 wherein said filler is present in an amount equal to about 2 to about 75 weight percent based on total weight of polymer and filler.

20. A process for improving the physical properties of a shaped body comprising an arylene sulfide polymer, said process comprising molding said arylene sulfide polymer to form a shaped body at a temperature above the softening point of said polymer, cooling said shaped body from said molding temperature to an annealing temperature between the second order transition temperature and the melting point of said polymer ranging from about 175 to about 650° F., maintaining said polymer at said annealing temperature for a time sufficient to effect an increase in the density of said shaped polymer of at least about 0.1 percent whereby an improvement is also effected in at least one of tensile strength, flexural strength, compressive strength, impact strength, elongation, flexural modulus, and hardness of said shaped body.

21. The process according to claim 20 wherein said shaped body is cooled to about room temperature after said molding, and is subsequently reheated to said annealing temperature.

22. A process for improving the physical properties of a shaped body comprising an arylene sulfide polymer, produced by reacting p-dichlorobenzene and sodium sulfide in a polar organic compound at an elevated temperature for a time sufficient to obtain said polymer, said process comprising annealing said shaped body at a temperature of from about 230° F. to about 536° F. for from about 3 to about 12 hours.

23. The annealed shaped body produced by the process of claim 22.

References Cited

UNITED STATES PATENTS 3,354,129  11/1967  Edmonds, Jr., et al. _____ 260—79

DONALD E. CZAJA, Primary Examiner

M. I. MARQUIS, Assistant Examiner

U.S. Cl. X.R.

260—79, 79.1; 264—235, 346